US010257548B2

United States Patent
Taylor et al.

(10) Patent No.: US 10,257,548 B2
(45) Date of Patent: Apr. 9, 2019

(54) CONTENT-BOUND TRUSTED EXECUTABLES

(71) Applicants: SONY CORPORATION, Tokyo (JP); SONY PICTURES ENTERTAINMENT INC, Culver City, CA (US)

(72) Inventors: Christopher Taylor, Culver City, CA (US); Spencer Stephens, Studio City, CA (US)

(73) Assignees: SONY CORPORATION, Tokyo (JP); SONY PICTURES ENTERTAINMENT INC., Culver City, CA (US)

(*) Notice: Subject to any disclaimer, the term of this patent is extended or adjusted under 35 U.S.C. 154(b) by 0 days.

(21) Appl. No.: 14/322,794

(22) Filed: Jul. 2, 2014

(65) Prior Publication Data

US 2015/0012932 A1    Jan. 8, 2015

Related U.S. Application Data (60) Provisional application No. 61/842,022, filed on Jul. 2, 2013.

(51) Int. Cl.
*H04N 21/81* (2011.01)
*H04N 21/458* (2011.01)
(Continued)

(52) U.S. Cl.
CPC ..... *H04N 21/2347* (2013.01); *H04N 21/4405* (2013.01); *H04N 21/4586* (2013.01);
(Continued)

(58) Field of Classification Search
CPC ........... H04N 21/2347; H04N 21/4405; H04N 21/4586; H04N 21/6334; H04N 21/8193; H04N 21/835
(Continued)

(56) References Cited

U.S. PATENT DOCUMENTS

| 8,474,005 B2 * | 6/2013 | Park ...................... G06F 21/121 |
| | | 726/1 |
| 2003/0217011 A1 * | 11/2003 | Peinado ................... G06F 21/10 |
| | | 705/59 |

(Continued)

FOREIGN PATENT DOCUMENTS

| WO | 2013081611 A1 | 6/2013 | |
| WO | WO 2013081611 A1 * | 6/2013 | ......... H04N 21/2541 |

OTHER PUBLICATIONS

Jack Purcher, Oct. 8, 2014, Patentlymobile.com, "Secure Mobile Payment Using Media Binding" MovieLabs.*

(Continued)

*Primary Examiner* — Nathan J Flynn
*Assistant Examiner* — Caroline Somera
(74) *Attorney, Agent, or Firm* — Procopio, Cory, Hargreaves & Savitch LLP (57) ABSTRACT

Delivering, protecting, and playing content, including: executing a content-bound executable application in a trusted execution environment by a player device; performing an integrity check of the player device using the content-bound executable application; sending a request from the player device for update information to at least one of the license server and the content server using the content-bound executable application; receiving update information at the player device from the at least one of the license server and the content server; updating local environment of the player device using the content-bound executable application; and decrypting the content data by the content-bound executable application. Key words include content-bound and executable.

13 Claims, 4 Drawing Sheets

(51) Int. Cl.
*H04N 21/835* (2011.01)
*H04N 21/2347* (2011.01)
*H04N 21/4405* (2011.01)
*H04N 21/6334* (2011.01)

(52) U.S. Cl.
CPC ..... *H04N 21/6334* (2013.01); *H04N 21/8193* (2013.01); *H04N 21/835* (2013.01)

(58) Field of Classification Search
USPC .......................................................... 725/25
See application file for complete search history.

(56) References Cited

U.S. PATENT DOCUMENTS

| | | | | |
|---|---|---|---|---|
| 2005/0119976 | A1* | 6/2005 | Taylor | G06Q 30/06 705/52 |
| 2006/0218544 | A1* | 9/2006 | Chakraborty | G06F 8/63 717/168 |
| 2008/0098481 | A1* | 4/2008 | Lee | G06F 21/10 726/26 |
| 2008/0130886 | A1* | 6/2008 | Kocher | G11B 20/00086 380/201 |
| 2009/0031141 | A1* | 1/2009 | Pearson | G06F 21/10 713/187 |
| 2009/0271319 | A1* | 10/2009 | Bromley | G11B 20/00086 705/59 |
| 2010/0169667 | A1* | 7/2010 | Dewan | G06F 21/10 713/193 |
| 2010/0223656 | A1* | 9/2010 | Ray | G06F 21/57 726/3 |
| 2012/0023147 | A1* | 1/2012 | Kim | G06F 8/61 707/827 |
| 2013/0124862 | A1* | 5/2013 | Pestoni | G06F 21/121 713/168 |
| 2013/0347064 | A1* | 12/2013 | Aissi | 726/2 |
| 2014/0075472 | A1* | 3/2014 | Mitsuya | G06F 21/10 725/32 |
| 2014/0095890 | A1* | 4/2014 | Mangalore et al. | 713/189 |
| 2014/0230010 | A1* | 8/2014 | Ginter et al. | 726/1 |
| 2014/0279115 | A1* | 9/2014 | Verma et al. | 705/21 |
| 2014/0279566 | A1* | 9/2014 | Verma et al. | 705/76 |
| 2015/0304736 | A1* | 10/2015 | Lal | G06F 21/10 380/210 |

OTHER PUBLICATIONS

Specification for Enhanced Content Protection—Version 1.0, Copyright 2013, Motion Picture Laboratories, Inc.*
International Search Report & Written Opinion for PCT/US2014/045308, dated Nov. 5, 2014, 13 pages.

* cited by examiner

CONTENT-BOUND TRUSTED EXECUTABLES

CROSS-REFERENCE TO RELATED APPLICATIONS

This application claims the benefit of priority under 35 U.S.C. § 119(e) of co-pending U.S. Provisional Patent Application No. 61/842,022, filed Jul. 2, 2013, entitled "Content Bound Trusted Executables". The disclosure of the above-referenced application is incorporated herein by reference.

BACKGROUND

Field of the Invention

The present invention relates to content delivery and protection, and more specifically, to effective content delivery and protection using a content-bound executable application.

Background

Blu-ray® introduced the concept of self-protecting content which was built on a virtual machine that allowed the solution to work on multiple platforms. Unfortunately, this type of solution was defeated and has proved to be less useful than hoped. Many modern system-on-chips (SoCs) being deployed into smartphones and many other devices are capable of executing software in Trusted Execution Environments (TEEs). The promise of a TEE is that any code being executed there will not be visible to the code executed in the untrusted Operating System (OS) environment.

SUMMARY

The present invention provides for effective content delivery and/or protection using a content-bound executable application.

In one implementation, a method for playing content is disclosed. The method includes: executing a content-bound executable application in a trusted execution environment by a player device; performing an integrity check of the player device using the content-bound executable application; sending a request from the player device for update information to at least one of the license server and the content server using the content-bound executable application; receiving update information at the player device from the at least one of the license server and the content server; updating local environment of the player device using the content-bound executable application; and decrypting the content data by the content-bound executable application.

In another implementation, a method for acquiring content is disclosed. The method includes: receiving content data and a content-bound executable application at a player device from a content server; receiving a license for the content data at the player device from a license server; executing the content-bound executable application in a trusted execution environment by the player device; performing an integrity check of the player device using the content-bound executable application; sending a request from the player device for update information to at least one of the license server and the content server using the content-bound executable application; receiving update information at the player device from the at least one of the license server and the content server; and updating local environment of the player device using the content-bound executable application.

In another implementation, a non-transitory storage medium storing a computer program to play content is disclosed. The computer program includes executable instructions that cause a computer to: execute a content-bound executable application in a trusted execution environment by a player device; perform an integrity check of the player device using the content-bound executable application; send a request from the player device for update information to at least one of the license server and the content server using the content-bound executable application; receive update information at the player device from the at least one of the license server and the content server; update local environment of the player device using the content-bound executable application; and decrypt the content data by the content-bound executable application.

In another implementation, an apparatus for playing content is disclosed. The apparatus includes: means for executing a content-bound executable application in a trusted execution environment; means for performing an integrity check of the apparatus using the content-bound executable application; means for sending a request from the apparatus for update information to at least one of a license server and a content server using the content-bound executable application; means for receiving update information from the at least one of the license server and the content server; means for updating local environment of the apparatus using the content-bound executable application; and means for decrypting the content data by the content-bound executable application.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

Certain implementations as disclosed herein provide for effective content protection by extending the concept of self-protecting code to the capabilities of modern platforms. In one implementation, a player device receives and stores content and a content-bound executable application or tool (i.e., a content-bound trusted executable) received with the content. The player device also receives a license for the content from a central licensing authority. The player device executes the received content-bound executable application in a secure environment, such as a trusted execution environment. The content-bound executable application updates the player device and manages access to the content according to the received license. In one implementation, the content is audio and/or video content. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

In one implementation, apparatus and methods to implement a technique for effective content delivery and/or protection using a content-bound executable application is disclosed. Further, a computer system provides the trusted execution environment in which to execute the content-bound executable application. Thus, using the apparatus, methods, and computer systems described below in detail the content delivery and/or protection technique can be made robust against known attacks while also requiring incremental effort from attackers for each file that is attacked. Features provided in the implementations can include, but are not limited to, one or more of the following items: Receiving the content-bound executable application with the content; Executing the content-bound executable application in the trusted execution environment on a player device; and Updating the local environment of the player device.

Figure 1:
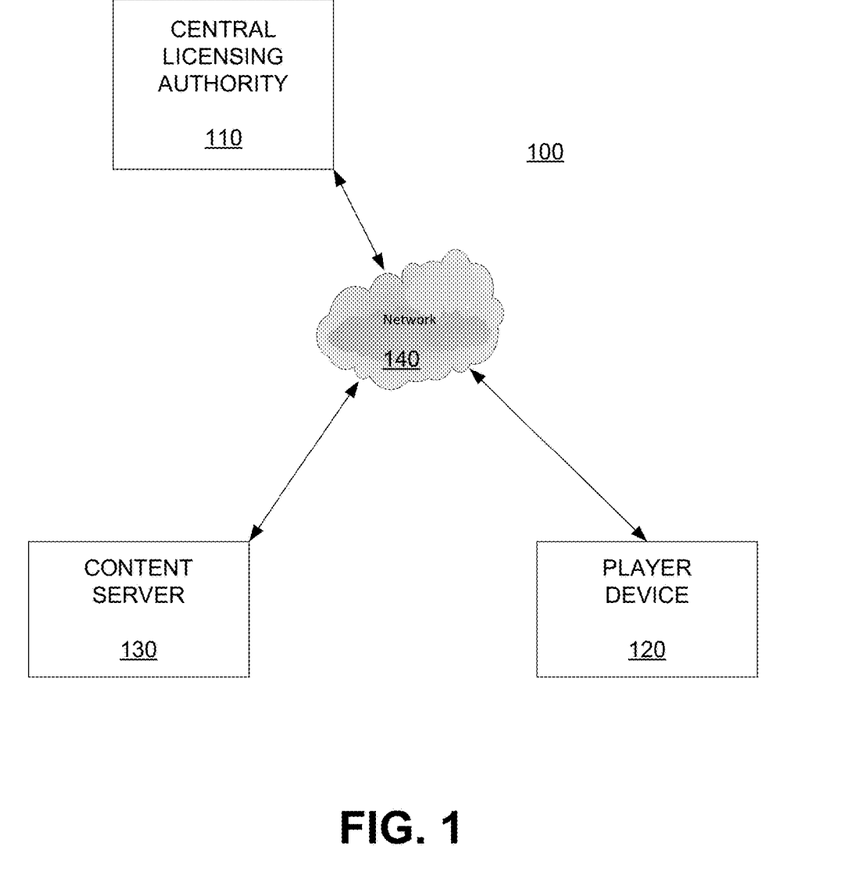
FIG. 1 is a protected-content playback system in accordance with one implementation of the present invention.

FIG. 1 is a protected-content playback system 100 in accordance with one implementation of the present invention. In the illustrated implementation of FIG. 1, the protected-content playback system 100 includes a central licensing authority 110, a player device 120, and a content server 130, which are interconnected through a network 140, such as the Internet.

The central licensing authority 110 is designated as a licensing authority for the system 100, which manages license and content access in the protected-content playback system 100. The central licensing authority 110 can be implemented as a network computer system with associated storage (e.g., a database) and can act as a server to receive, process, and respond to client requests. The player device 120 receives, stores, and plays content, such as audio or video data (e.g., music, movies). The player device 120 can be implemented as a media player, such as a Blu-ray Disc player, mobile device (e.g., smartphone, tablet), game console, or computer system. The content server 130 stores and provides content and content-related data within the content playback system 100. The content server 130 can be implemented as a network computer system with associated storage (e.g., a database) and can act as a server to receive, process, and respond to client requests. The content playback system 100 can include multiple servers and player devices. However, for simplicity, only one of each of the servers 110, 130 and player device 120 are shown in FIG. 1.

In one implementation, a system provides content delivery using a central licensing authority 110, which establishes the rules of operation of the content playback system 100. The player device 120 is certified to meet compliance and robustness rules established by the central licensing authority 110. In another implementation, these rules can be established by a separate server or authority system with or instead of the central licensing authority 110. In one example, at least some of the rules are agreed to by the manufacturer of the player device 120 and are programmed into player device 120 by the manufacturer (e.g., before sale). In a further implementation, the content-bound executable application is executed to apply additional rules of the license (in addition to the rules already programmed into the player device) to the player device for playing the content.

The player device 120 implements a trusted execution environment (TEE) in accordance to specifications defined by the central licensing authority 110. The player device 120 is configured to receive from the central licensing authority 110 and store a unique key defining compliance level(s) for the player device 120. In an implementation with multiple devices, each player device receives its own unique key.

Figure 2:
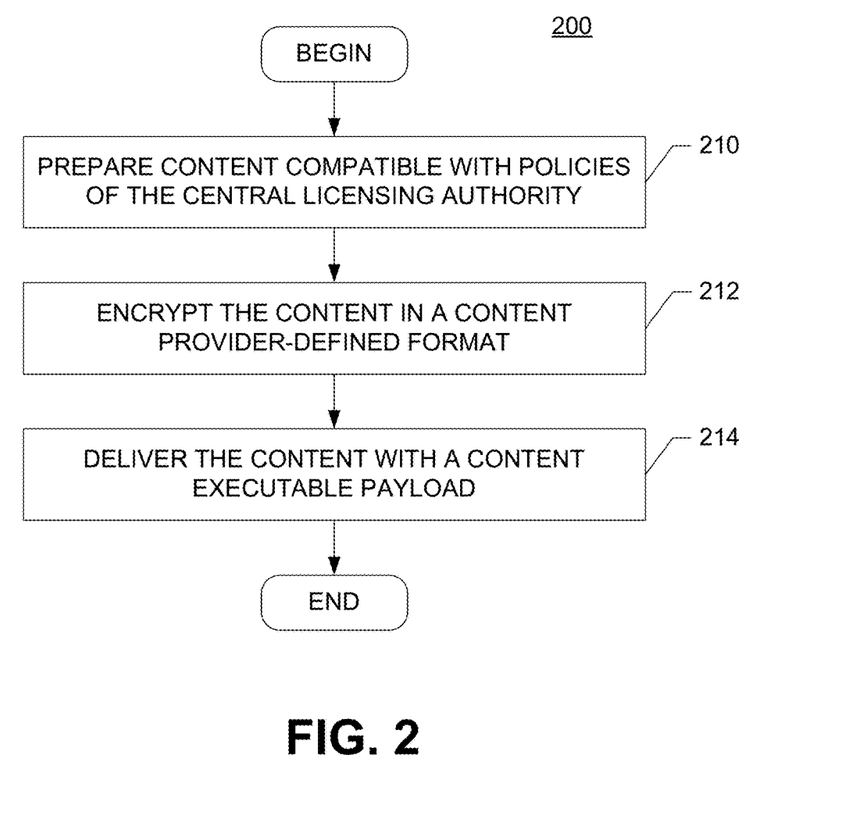
FIG. 2 is a flow diagram illustrating content delivery and protection in accordance with one implementation of the present invention.

In operation, a content provider uses the content server 130 to prepare the content to be compatible with the policies of the central licensing authority 110. FIG. 2 is a flow diagram 200 illustrating content delivery and protection in accordance with one implementation of the present invention. Initially, the content is prepared, at step 210, to be compatible with policies of the central licensing authority 110. In one implementation, the content is encrypted in a content provider-defined format, at step 212. The content is then delivered with a content-bound executable application, at step 214.

Figure 3:
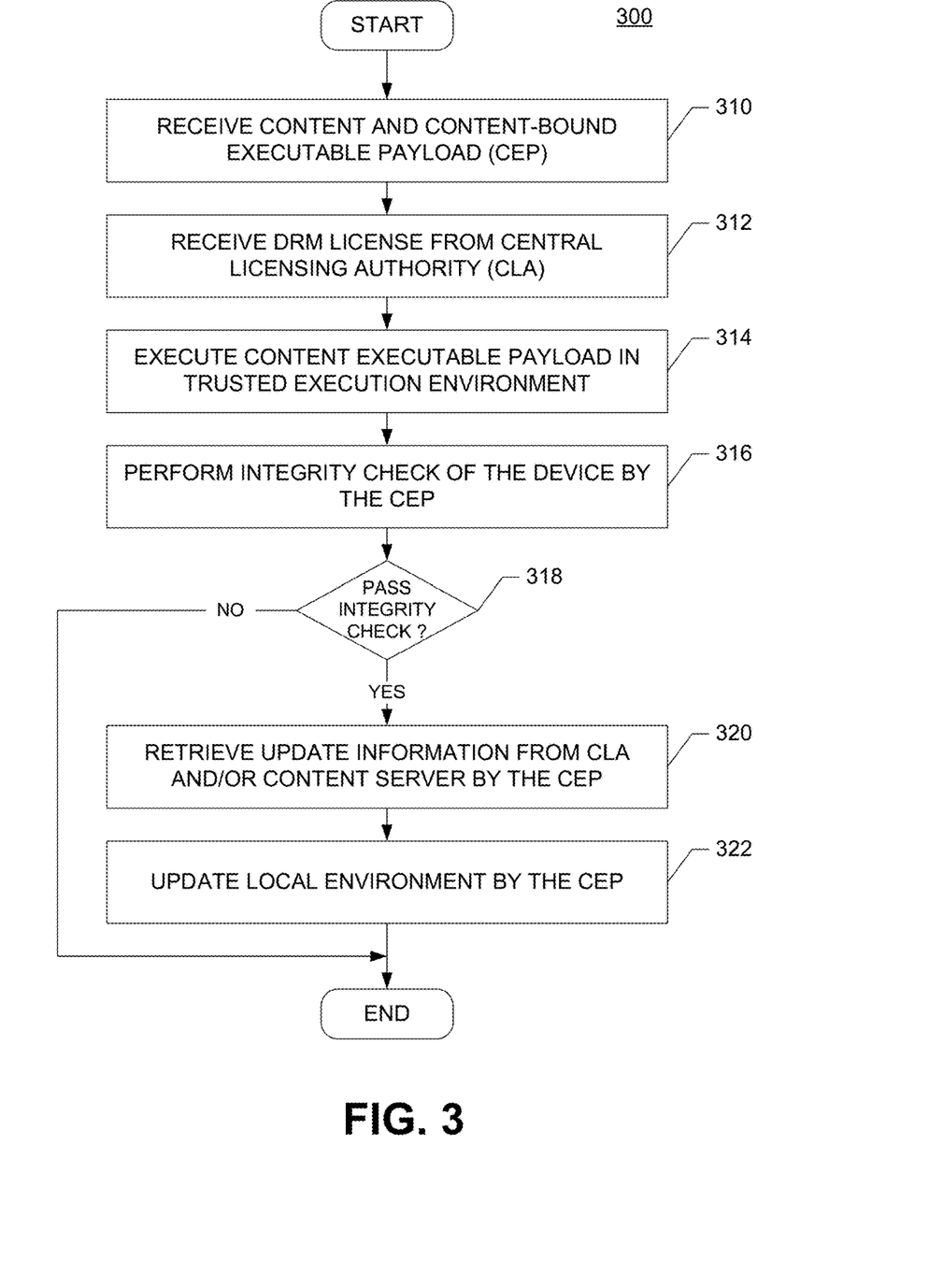
FIG. 3 is a flow diagram illustrating a content acquisition process in accordance with one implementation of the present invention.

To play or execute the content, the player device 120 first acquires the content from the content server 130. FIG. 3 is a flow diagram 300 illustrating a content acquisition process in accordance with one implementation of the present invention. Initially, the content and the content-bound executable application are received by the player device 120, at step 310. The player device 120 also receives a digital rights management (DRM) license for the content, at step 312, from the central licensing authority 110. The player device 120 executes, at step 314, the content-bound executable application in a trusted execution environment. The content-bound executable application then performs, at step 316, an integrity check of the player device 120. In one implementation, the integrity check involves verifying that the trusted execution environment of the player device 120 is properly configured and that the software managing the play/execution of the content has not been tempered. If it is determined, at step 318, that the integrity check failed, the play/execution of the content is aborted. Otherwise, if it is determined, at step 318, that the integrity check passed, the content-bound executable application retrieves update information from the central licensing authority 110 and/or Content Distributor Server (e.g., content server 130), at step 320. The content-bound executable application then updates the local environment, at step 322.

Figure 4:
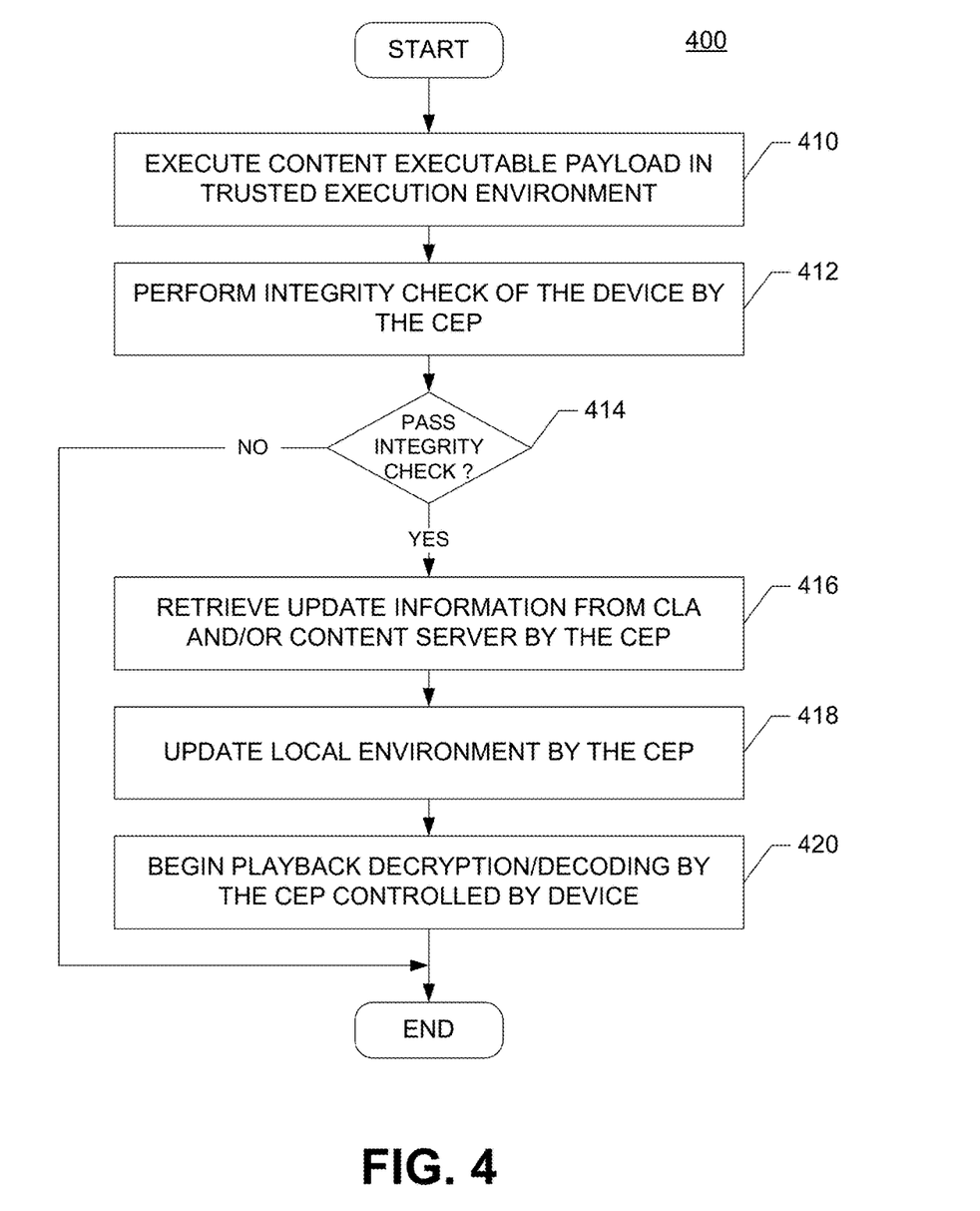
FIG. 4 is a flow diagram illustrating a content playback process for a player device in accordance with one implementation of the present invention.

FIG. 4 is a flow diagram 400 illustrating a content playback process for a player device in accordance with one implementation of the present invention. In one implementation, the player device 120 executes, at step 410, the content-bound executable application in a trusted execution environment. In another implementation, the player device 120 executes the content executable in a normal environment instead of the trusted executable environment. Alternatively, a player device can use the trusted executable environment for some operations or conditions, and the normal environment for others. In one example, the player device uses the trusted executable environment for the content acquisition process but uses the normal environment for playback. In another example, the central licensing authority or content provider defines, for a device or item of content, which type of execution environment to use and/or when to use the execution environment. Thus, in that case, the player device 120 first checks the received execution instructions and then executes appropriately.

The content-bound executable application then performs, at step 412, an integrity check of the player device 120. In one implementation, the integrity check involves determining that the software managing the play/execution of the content has not been tempered. In another implementation, the integrity check involves verifying that the trusted execution environment of the player device 120 is properly configured. If it is determined, at step 414, that the integrity check failed, the play/execution of the content is aborted. Otherwise, if it is determined, at step 414, that the integrity check passed, the content-bound executable application retrieves update information from the central licensing authority 110 and/or the content server 130, at step 416. The content-bound executable application updates the local environment, at step 418, and initiates the playback decryption/decoding, at step 420. In one implementation, the updating of the local environment, at step 418, is performed in the background. In another implementation, the initiation of the playback decryption or decoding, at step 420, is controlled by the player device 120.

While the above examples focus on audio and video content, other types of content are contemplated. For example, the content can be games, software, or other data. In another example, the content is private medical data that is protected for personal or legal reasons. Thus, in the case of the content being medical data, the content server 130 can be a medical lab or testing center, while the player device 120 can be a computing device with a display at the doctor's office. Further, the central licensing authority 110 can be a records database storing patient authorizations for the dissemination of the medical data.

The foregoing methods, apparatus, and associated non-transitory storage medium are susceptible to many variations. Additionally, for clear and brief description, many descriptions of the methods, apparatus, and non-transitory storage medium have been simplified. Many descriptions use terminology and structures of specific standards. However, the disclosed methods, apparatus, and non-transitory storage medium are more broadly applicable.

Those of skill in the art will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules.

The above description of the disclosed implementations is provided to enable any person skilled in the art to make or use the invention. Various modifications to these implementations will be readily apparent to those skilled in the art, and the generic principles described herein can be applied to other embodiments without departing from the spirit or scope of the invention. Accordingly, the techniques are not limited to the specific examples described above. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for playing content data, comprising:
receiving the content data together with a content-bound executable application at a player device, wherein the content data was prepared to be compatible with policies of a central licensing authority;
executing the content-bound executable application received with the content data in a trusted execution environment by the player device to make the content-bound executable application not be visible outside of the trusted execution environment, the content-bound executable application performing an integrity check of the player device, wherein the content-bound executable application is executed in a normal environment or the trusted execution environment, where the central licensing authority defines, for a device or item of content, which type of execution environment to use and when to use the execution environment,
wherein the integrity check determines that at least one of: (1) software managing execution or play of the content data has not been tempered with; and (2) the trusted execution environment of the player device is properly configured;
sending a request from the player device for update information for updating local environment of the player device to at least one of a license server of the central licensing authority and a content server using the content-bound executable application when the integrity check is successfully completed;
receiving the update information at the player device from the at least one of the license server and the content server;
updating the local environment of the player device using the content-bound executable application and the update information;
decrypting the content data by the content-bound executable application within the updated local environment; and
receiving from the license server and storing at the player device a unique key defining a compliance level of the player device.

2. The method of claim 1, wherein the player device comprises a mobile device, and the content data includes video data for a movie.

3. The method of claim 1, wherein at least one rule regarding playing the content data on the player device is programmed into the player device.

4. The method of claim 3, wherein the content-bound executable application is executed to apply additional rules of the license, in addition to the at least one rule, to the player device for playing the content data.

5. The method of claim 1, wherein the player device executes the content-bound executable application in the trusted execution environment in accordance with specifications defined by the license server.

6. The method of claim 1, wherein the content-bound executable application updates the local environment as a background process.

7. A method for acquiring content, comprising:
receiving content data together with a content-bound executable application at a player device from a content server;
receiving a license for the content data at the player device from a license server,
wherein the content data was prepared to be compatible with policies of a central licensing authority;
executing the content-bound executable application received with the content data in a trusted execution environment by the player device to make the content-bound executable application not be visible outside of the trusted execution environment, the content-bound executable application performing an integrity check of the player device, wherein the content-bound executable application is executed in a normal environment or the trusted execution environment, where the central licensing authority defines, for a device or item of content, which type of execution environment to use and when to use the execution environment,
wherein the integrity check determines that at least one of: (1) software managing execution or play of the content has not been tempered with; and (2) the trusted execution environment of the player device is properly configured;
sending a request from the player device for update information for updating local environment of the player device to at least one of the license server of the central licensing authority and the content server using the content-bound executable application when the integrity check is successfully completed;
receiving the update information at the player device from the at least one of the license server and the content server;
updating the local environment of the player device using the content-bound executable application and the update information; and
receiving from the license server and storing at the player device a unique key defining a compliance level of the player device.

8. A non-transitory storage medium storing a computer program to play content data, the computer program comprising executable instructions which cause a computer to:
receive the content data together with a content-bound executable application at a player device, wherein the content data was prepared to be compatible with policies of a central licensing authority;
execute the content-bound executable application received with the content data in a trusted execution environment by the player device to make the content-bound executable application not be visible outside of the trusted execution environment, the content-bound executable application performing an integrity check of the player device, wherein the content-bound executable application is executed in a normal environment or the trusted execution environment, where the central licensing authority defines, for a device or item of content, which type of execution environment to use and when to use the execution environment,
wherein the integrity check determines that at least one of: (1) software managing execution or play of the content data has not been tempered with; and (2) the trusted execution environment of the player device is properly configured;
send a request from the player device for update information for updating local environment of the player device to at least one of a license server of the central licensing authority and a content server using the content-bound executable application when the integrity check is successfully completed;
receive the update information at the player device from the at least one of the license server and the content server;
update the local environment of the player device using the content-bound executable application and the update information;
decrypt the content data by the content-bound executable application within the updated local environment; and
receive from the license server and storing at the player device a unique key defining a compliance level of the player device.

9. The non-transitory storage medium of claim 8, wherein executable instructions which cause the computer to execute the content-bound executable application comprise executable instructions which cause the computer to apply rules of the license to the player device for playing the content data.

10. The non-transitory storage medium of claim 8, wherein executable instructions which cause the computer to execute the content-bound executable application comprise executable instructions which cause the computer to execute the content-bound executable application in the trusted execution environment in accordance with specifications defined by the license server.

11. The non-transitory storage medium of claim 8, wherein executable instructions which cause the computer to update local environment of the player device are run as a background process.

12. An apparatus for playing content, the apparatus comprising:
means for receiving the content together with a content-bound executable application at a player device, wherein the content data was prepared to be compatible with policies of a central licensing authority;
means for executing the content-bound executable application received with the content in a trusted execution environment by the player device to make the content-bound executable application not be visible outside of the trusted execution environment, the content-bound executable application performing an integrity check of the player device, wherein the content-bound executable application is executed in a normal environment or the trusted execution environment, where the central licensing authority defines, for a device or item of content, which type of execution environment to use and when to use the execution environment,
wherein the integrity check determines that at least one of: (1) software managing execution or play of the content has not been tempered with; and (2) the trusted execution environment of the player device is properly configured;
means for sending a request from the apparatus for update information for updating local environment of the player device to at least one of a license server of the central licensing authority and a content server using the content-bound executable application when the integrity check is successfully completed;

means for receiving the update information from the at least one of the license server and the content server;

means for updating the local environment of the apparatus using the content-bound executable application and the update information;

means for decrypting the content by the content-bound executable application within the updated local environment; and means for receiving from the license server and storing at the player device a unique key defining a compliance level of the player device.

13. The apparatus of claim 12, wherein means for updating the local environment comprises means for updating the local environment as a background process.

* * * * *